UNITED STATES PATENT OFFICE.

KARL PAUL GRÄLERT, MAX BUFF, AND JOSEPH FLACHSLAENDER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN SULFUR DYE.

1,126,630.  Specification of Letters Patent.  Patented Jan. 26, 1915.

No Drawing.  Application filed July 8, 1913. Serial No. 777,844.

*To all whom it may concern:*

Be it known that we, KARL PAUL GRÄLERT, MAX BUFF, and JOSEPH FLACHSLAENDER, doctors of philosophy, chemists, citizens of the German Empire, all residing at Elberfeld, Germany, have invented new and useful Improvements in Brown Sulfur Dye, of which the following is a specification.

Our invention relates to the manufacture and production of new and valuable brown sulfur colors which are obtained by treating with alkali polysulfids and copper or copper compounds phthaloperinone compounds having most probably the formula:

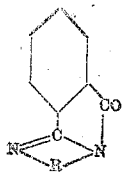

in which R stands for a naphthalene nucleus which may contain sulfonic groups.

The new dyes are after being dried and pulverized dark powders soluble in a solution of sodium sulfid generally with a yellowish-brown to red-brown coloration and soluble in concentrated sulfuric acid with a brown coloration. They dye cotton in bloomy catechu-brown shades distinguished by their fastness to light.

In order to illustrate the new process more fully the following example is given, the parts being by weight: 135 parts of crystallized sodium sulfid, 35 parts of sulfur, 10 parts of copper, 30 parts of phthaloperinone-5.8-disulfonic acid having most probably the following formula:

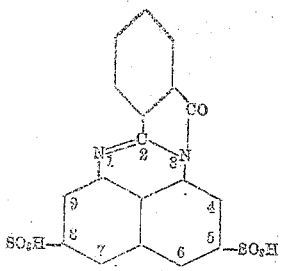

are heated during 10 hours to 200° to 220° C. The melt is powdered and is then ready for use. The dyestuff is a dark powder soluble in a sodium sulfid solution with a reddish-brown coloration. It is soluble in concentrated sulfuric acid with a brown coloration and dyes cotton in pure reddish-brown shades fast to light.

The above mentioned quantities of sodium sulfid and of sulfur as well as the temperature and the duration of the reaction can be varied within wide limits.

Similar dyestuffs are obtained by using other of the above mentioned products, such as phthaloperinone, phthaloperinone-monosulfonic acid or the perimidylbenzoic acid respectively the sulfonic acids of perimidyl-ortho-benzoic acid (obtained by the condensation from 1.8-naphthylenediaminsulfonic acids with phthalic acid anhydrid) such as 5.8-disulfonic acid of perimidyl-ortho-benzoic acid, etc.

We claim:

1. The new sulfur dyes obtained from phthaloperinone compounds having most probably the formula:

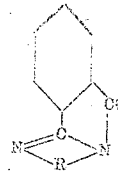

in which R stands for a naphthalene nucleus which contains sulfonic groups, which dyes are after being dried and pulverized dark powders being soluble in a solution of sodium sulfid generally with a yellowish-brown to red-brown coloration; being soluble in concentrated sulfuric acid with a brown coloration; and dyeing unmordanted cotton bloomy from brown to reddish-brown shades fast to light, substantially as described.

2. The new sulfur dye obtained from phthaloperinone-5.8-disulfonic acid having most probably the formula:

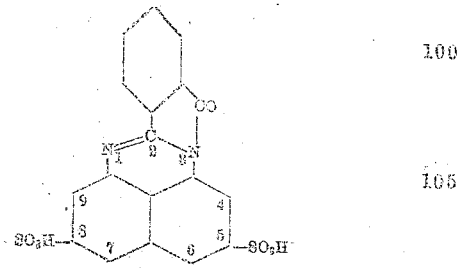

which is after being dried and pulverized a dark powder soluble in a sodium sulfid solution with a reddish-brown coloration and soluble in concentrated sulfuric acid with a brown coloration; dyeing unmordanted cotton in pure reddish-brown shades fast to light, substantially as described.

In testimony whereof we have hereunto set our hands in the presence of two subscribing witnesses.

KARL PAUL GRÄLERT. [L. S.]
MAX BUFF. [L. S.]
JOSEPH FLACHSLAENDER. [L. S.]

Witnesses:
HELEN NUFER,
ALBERT NUFER.